US010563535B2

(12) United States Patent
Vetters et al.

(10) Patent No.: US 10,563,535 B2
(45) Date of Patent: Feb. 18, 2020

(54) KEYSTONED BLADE TRACK

(71) Applicants: Rolls-Royce North American Technologies, Inc., Indianapolis, IN (US); Rolls-Royce Corporation, Indianapolis, IN (US); Rolls-Royce plc, London (GB)

(72) Inventors: Daniel K. Vetters, Indianapolis, IN (US); Aaron D. Sippel, Zionsville, IN (US); David J. Thomas, Brownsburg, IN (US); Andrew J. Eifert, Indianapolis, IN (US); Paul A. Davis, Yate (GB); Simon L. Jones, Bristol (GB); Peter Broadhead, Derby (GB); Bruce E. Varney, Greenwood, IN (US); Jeffrey A. Walston, Indianapolis, IN (US); Steven Hillier, Middleton (GB)

(73) Assignees: Rolls-Royce Corporation, Indianapolis, IN (US); Rolls-Royce North American Technologies Inc., Indianapolis, IN (US); Rolls-Royce plc (GB)

(*) Notice: Subject to any disclaimer, the term of this patent is extended or adjusted under 35 U.S.C. 154(b) by 1213 days.

(21) Appl. No.: 15/090,134

(22) Filed: Apr. 4, 2016

(65) Prior Publication Data
US 2016/0319689 A1 Nov. 3, 2016

Related U.S. Application Data

(60) Provisional application No. 62/154,461, filed on Apr. 29, 2015, provisional application No. 62/154,400, filed on Apr. 29, 2015.

(51) Int. Cl.
*F01D 11/12* (2006.01)
*F01D 25/12* (2006.01)
(Continued)

(52) U.S. Cl.
CPC .......... *F01D 11/122* (2013.01); *C04B 35/803* (2013.01); *C04B 35/806* (2013.01);
(Continued)

(58) Field of Classification Search
None
See application file for complete search history.

(56) References Cited

U.S. PATENT DOCUMENTS 5,104,287 A * 4/1992 Ciokajlo ................. F01D 11/22
415/126
7,771,160 B2 * 8/2010 Shi ........................... F01D 9/04
415/138

(Continued)

FOREIGN PATENT DOCUMENTS

DE 102008044450 A1 2/2009
EP 2589774 A1 5/2013
(Continued)

OTHER PUBLICATIONS

Extended European Search Report, European Application No. 16164265. 7-1610, dated Sep. 30, 2016, 7 pages.
(Continued)

*Primary Examiner* — Kayla McCaffrey
(74) *Attorney, Agent, or Firm* — Barnes & Thornburg LLP

(57) ABSTRACT

A blade track for a gas turbine engine includes a plurality of blade track segments. The blade track segments are arranged circumferentially around a central axis to form the blade track.

13 Claims, 9 Drawing Sheets

(51) Int. Cl.
  *F01D 25/00* (2006.01)
  *F04D 29/16* (2006.01)
  *F04D 29/52* (2006.01)
  *C04B 35/80* (2006.01)
  *C04B 35/83* (2006.01)

(52) U.S. Cl.
  CPC .............. *C04B 35/83* (2013.01); *F01D 11/12* (2013.01); *F01D 25/005* (2013.01); *F01D 25/12* (2013.01); *F04D 29/164* (2013.01); *F04D 29/526* (2013.01); *C04B 2235/5252* (2013.01); *C04B 2235/94* (2013.01); *F05D 2220/32* (2013.01); *F05D 2230/60* (2013.01); *F05D 2240/11* (2013.01); *F05D 2240/55* (2013.01); *F05D 2260/22141* (2013.01); *F05D 2260/52* (2013.01); *F05D 2300/6033* (2013.01); *Y02T 50/672* (2013.01)

(56) References Cited

U.S. PATENT DOCUMENTS

| | | |
|---|---|---|
| 8,167,546 B2 | 5/2012 | Shi et al. |
| 8,496,431 B2 | 7/2013 | Habarou et al. |
| 8,511,975 B2 | 8/2013 | Shi et al. |
| 8,684,689 B2 | 4/2014 | Guo et al. |
| 8,801,372 B2 | 8/2014 | Shi et al. |
| 8,834,106 B2 | 9/2014 | Luczak |
| 2004/0047726 A1 | 3/2004 | Morrison |
| 2010/0150703 A1 | 6/2010 | Gonzalez et al. |
| 2012/0156029 A1 | 6/2012 | Karafillis et al. |
| 2012/0301269 A1 | 11/2012 | Alvanos et al. |
| 2013/0011248 A1 | 1/2013 | Croteau et al. |
| 2014/0202168 A1 | 7/2014 | Shapiro et al. |

FOREIGN PATENT DOCUMENTS

| | | |
|---|---|---|
| FR | 2980235 B1 | 4/2015 |
| GB | 2235730 A | 3/1991 |
| GB | 2468768 A | 9/2010 |
| WO | 2010058137 A1 | 5/2010 |

OTHER PUBLICATIONS

Extended European Search Report, European Application No. 16165824.0-1610, dated Sep. 30, 2016, 7 pages.

Gorman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

\* cited by examiner

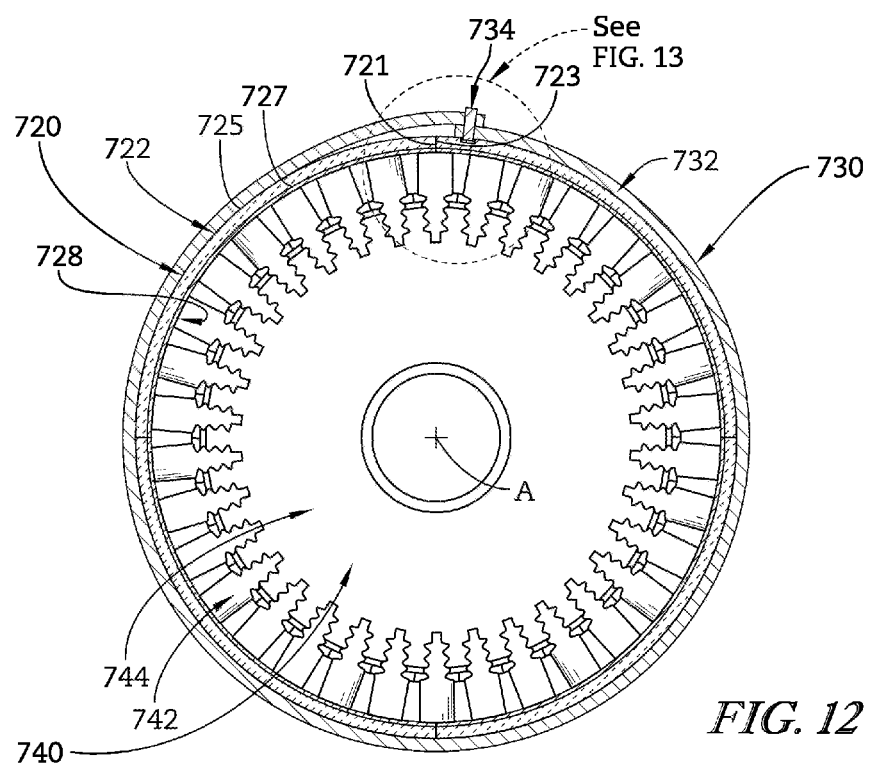
FIG. 12
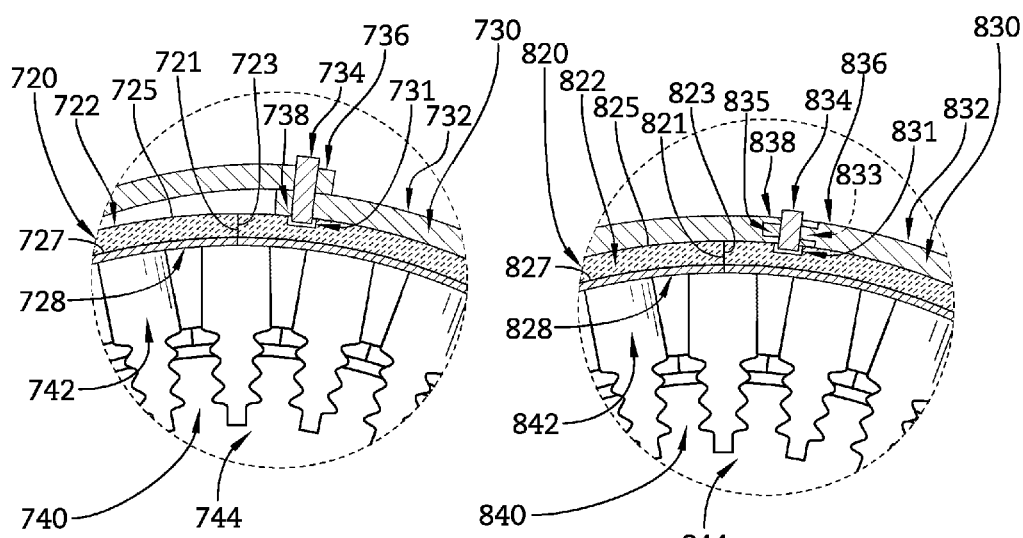
FIG. 13
FIG. 14

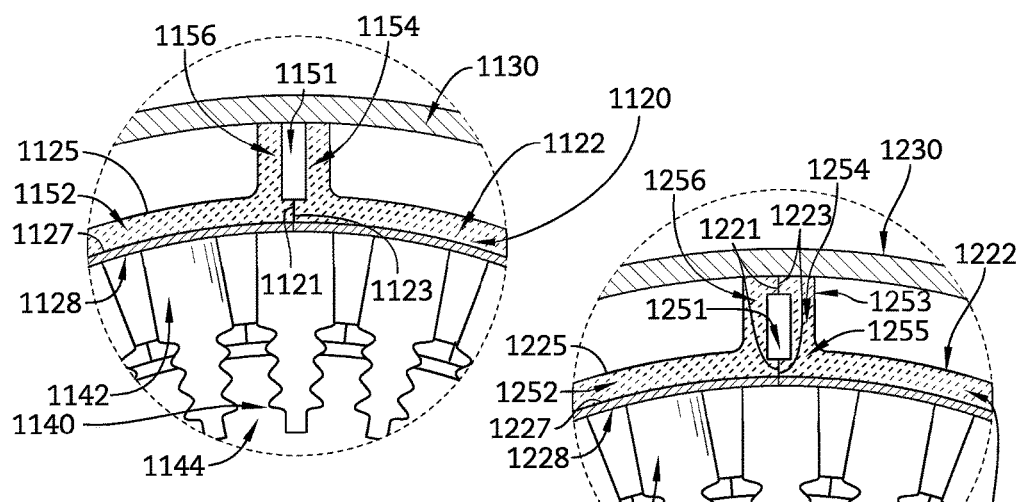
FIG. 19
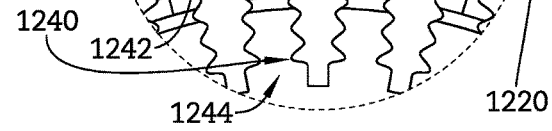
FIG. 20
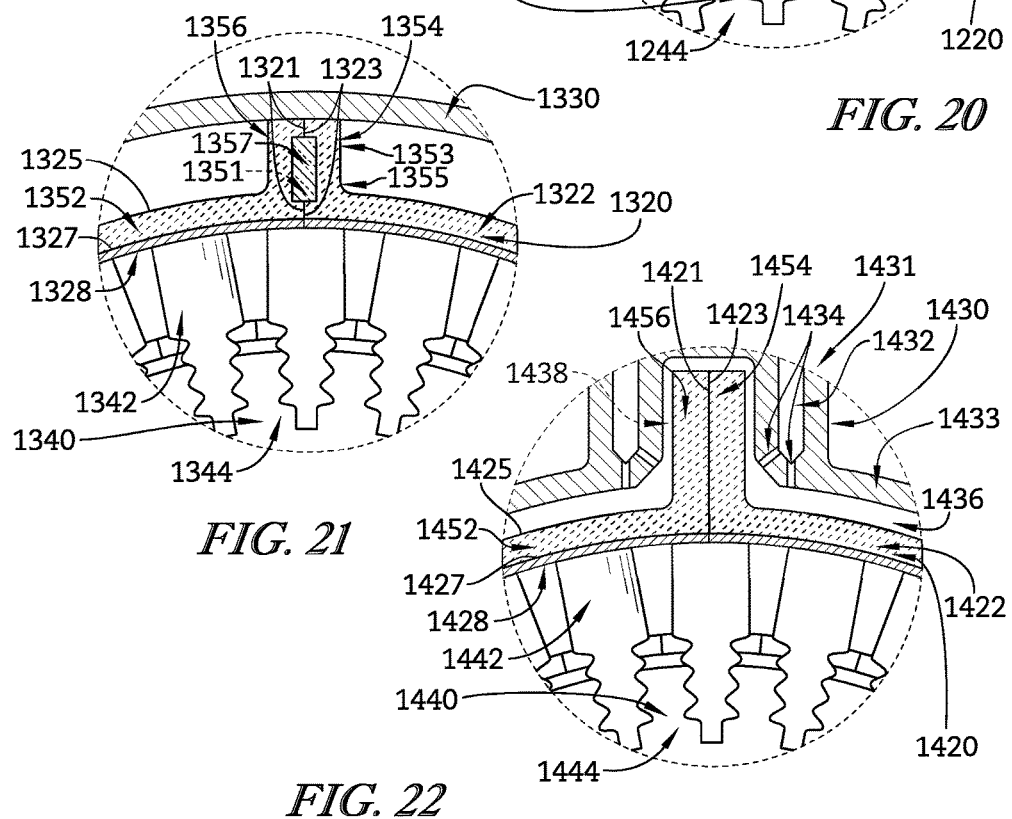
FIG. 21
FIG. 22

KEYSTONED BLADE TRACK

CROSS REFERENCE TO RELATED APPLICATIONS

This application claims priority to and the benefit of U.S. Provisional Patent Application No. 62/154,461, filed 29 Apr. 2015, and the benefit of U.S. Provisional Application No. 62/154,400, filed 29 Apr. 2015, the disclosures of which are now expressly incorporated herein by reference.

FIELD OF THE DISCLOSURE

The present disclosure relates generally to gas turbine engines, and more specifically to ceramic-containing composite blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gasses moving through a primary gas path of the engine. The rotating wheel assemblies include disks carrying blades around their outer edges. When the rotating wheel assemblies turn, tips of the blades move along blade tracks that are arranged around the rotating wheel assemblies. Such blade tracks are adapted to reduce the leakage of gas over the blades without interaction with the blades. The blade tracks may also be designed to minimize leakage of gas into or out of the primary gas path.

SUMMARY

The present disclosure may comprise one or more of the following features and combinations thereof.

According to the present disclosure, a blade-track system for a gas turbine engine may include a blade track and a track biaser positioned to surround the blade track. The blade track may include a plurality of blade track segments positioned circumferentially around a central axis to form a ring. Each blade track segment may comprise ceramic-matrix composite materials and may be shaped to extend part-way around the central axis. Each blade track segment may include opposing circumferential end faces and a radially outer surface extending between the end faces. The end faces of the blade track segments may be engaged with one another and the track biaser may be configured to provide means for radially biasing the blade track segments toward the central axis such that each blade track segment acts as a keystone to maintain the form of the ring.

In illustrative embodiments, the end faces of the blade track segments may be configured to engage and form a resultant radially-outward force away from the central axis against the track biaser.

In illustrative embodiments, the track biaser may be positioned to engage the blade track segments to provide a radially-inward force against the blade track segments.

In illustrative embodiments, the track biaser may include at least one unitary ring sized to surround the blade track and engage the outer surfaces of the blade track segments.

In illustrative embodiments, the at least one unitary ring may include a first unitary ring substantially aligned with an axially-forward face of the blade track segments and a second unitary ring substantially aligned with an axially-aft face of the blade track segments.

In illustrative embodiments, each of the blade track segments may further include a first bevel surface extending between the axially-forward face and the outer surface and a second bevel surface extending between the axially-aft face and the outer surface. The first and second bevel surfaces may be angled radially inward relative to the outer surface. The first and second rings may be configured to engage the first and second bevel surfaces to provide the radially-inward force.

In illustrative embodiments, the blade-track system may further include springs positioned to bias the first and second rings toward one another.

In illustrative embodiments, the blade-track system may further include spacers positioned between the springs and the first and second rings.

In illustrative embodiments, the track biaser may further include a plurality of outer fins extending radially outward from and circumferentially along the at least one unitary ring. The fins may be spaced apart from one another to define cooling channels.

In illustrative embodiments, the blade-track system may further include a heat-transfer layer positioned between the at least one unitary ring and the blade track.

In illustrative embodiments, the blade track may further include a plurality of inner fins extending radially inward from and circumferentially along the at least one unitary ring. The inner fins may be spaced apart from one another to define insulation-receiving channels.

In illustrative embodiments, the blade-track system may further include an insulative material positioned within the insulation-receiving channels between the at least one unitary ring and the blade track.

In illustrative embodiments, the track biaser may include at least one band having first and second ends and sized to surround the blade track to engage the outer surfaces of the blade track segments.

In illustrative embodiments, the track biaser may further include a pin extending through the first and second ends of the band to couple the first end to the second end.

In illustrative embodiments, one of the first end and second end may be positioned radially outward of the other one of the first end and second end.

In illustrative embodiments, the pin may extend radially through the first and second ends and into a recess formed in the blade track.

In illustrative embodiments, the first end may be formed to include a tab and the second end is formed to include a slot sized to receive the tab.

In illustrative embodiments, the pin may extend radially through the first and second ends and into a recess formed in the blade track.

In illustrative embodiments, the pin may extend axially through the first and second ends.

In illustrative embodiments, each of the blade track segments may further include a runner and a pair of flanges that extend radially outward from the outer surface of the blade track segment and along the end faces.

In illustrative embodiments, the track biaser may be sized and positioned to contact the flanges.

In illustrative embodiments, the flanges may be spaced apart from the end faces on the outer surface of the blade track segments.

In illustrative embodiments, the flanges may at least partially define the end faces of the blade track segments.

In illustrative embodiments, the flanges may each include a first end coupled to the runner and a second end spaced from the first end. The second ends of adjacent blade track segments may engage with one another.

In illustrative embodiments, the flanges of adjacent blade track segments may cooperate to form an air gap between the flanges.

In illustrative embodiments, the flanges of adjacent blade track segments may cooperate to form an insulator receiver between the flanges.

In illustrative embodiments, the blade-track system may further include an insulative material positioned within the insulator receiver.

In illustrative embodiments, each of the blade track segments may further include a runner and a pair of flanges that extend radially outward from the outer surface of the blade track segment and along the end faces.

In illustrative embodiments, the track biaser may include a plurality of air-flow heads and a plurality of ring segments coupled between the air-flow heads such that the track biaser surrounds the blade track.

In illustrative embodiments, the ring segments may be radially spaced apart from the runners of the blade track segments to define an air gap.

In illustrative embodiments, the air-flow heads may be formed to include at least one cooling-air plenum and at least one hole in fluid communication with the air gap and cooling-air plenum.

In illustrative embodiments, the air-flow heads may be further formed to include a recess sized to receive mating flanges of an adjacent pair of blade track segments.

In illustrative embodiments, the air-flow heads may be configured to pass cooling air from the cooling-air plenum into the air gap to pressurize a space between the track biaser and the blade track to provide a radially-inward force on the blade track segments.

In illustrative embodiments, the track biaser may include a ring sized to surround the blade track and a plurality of wave springs positioned between the ring and the blade track.

In illustrative embodiments, each wave spring may include a first end and a second end spaced apart from the first end. The first end may be biased toward the second end.

In illustrative embodiments, the ring may be formed to include a plurality of recesses and wherein the first ends of the wave springs are positioned in the recesses.

In illustrative embodiments, each wave spring may further include a plurality of peaks configured to contact the ring and a plurality of valleys configured to contact the blade track segments. The peaks and valleys may be positioned between the first and second ends of the wave springs.

In illustrative embodiments, the blade track segments of the blade track may be co-processed such the blade track segments are coupled together.

These and other features of the present disclosure will become more apparent from the following description of the illustrative embodiments.

BRIEF DESCRIPTION OF THE DRAWINGS

FIG. 12 is a view similar to FIG. 2 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine;

FIG. 13 is a detail view of the track biaser of FIG. 12 showing that the track biaser includes a metallic band positioned to surround the blade track segments and a radially-extending pin coupled between stacked, opposing ends of the band and suggesting that the band engages with a radially outer surface of the blade track segments to provide a radially inward force that holds the blade track segments together;

FIG. 14 is a view similar to FIG. 13 showing that another embodiment of a track biaser in accordance with the present disclosure includes a metallic band positioned to surround the blade track segments and a radially-extending pin coupled between fitted, opposing ends of the band and suggesting that the band engages with a radially outer surface of the blade track segments to provide a radially inward force that holds the blade track segments together;

FIG. 19 is a view similar to FIG. 18 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that the track biaser engages with the flanges to provide a radially inward force that holds the blade track segments together;

FIG. 20 is a view similar to FIG. 19 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that radially outer ends of the flanges of adjacent blade track segments engage one another;

FIG. 21 is a view similar to FIG. 20 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that the flanges of adjacent blade track segments define a recess for holding an insulative material; and FIG. 22 is a partial sectional view of another embodiment of a track biaser in accordance with the present disclosure showing that the track biaser is positioned to surround a blade track formed from a plurality of blade track segments and includes a plurality of flow channels configured to pressurize a space between the blade track segments and the track biaser to provide a radially inward force that holds the blade track segments together.

DETAILED DESCRIPTION OF THE DRAWINGS

Figure 1:
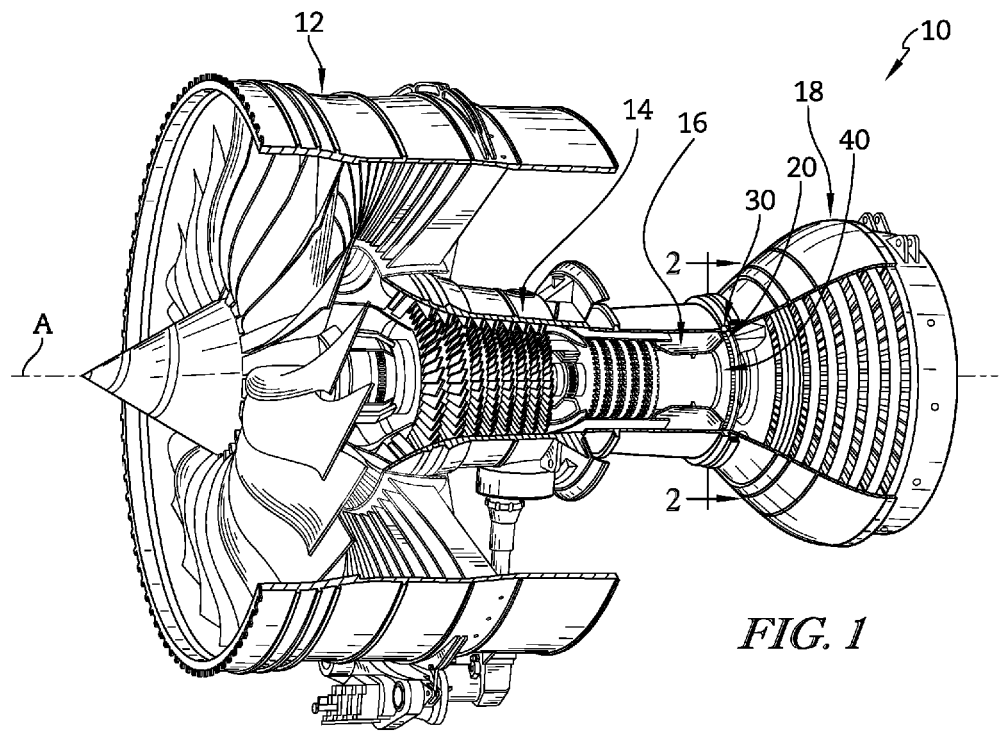
FIG. 1 is a perspective view of a gas turbine engine cut away to show that the engine includes a fan, a compressor, a combustor, and a turbine.

For the purposes of promoting an understanding of the principles of the disclosure, reference will now be made to a number of illustrative embodiments illustrated in the drawings and specific language will be used to describe the same.

FIG. 1 shows an illustrative aerospace gas turbine engine 10 cut-away to show that the engine 10 includes a fan 12, a compressor 14, a combustor 16, and a turbine 18. The fan 12 pushes air through the engine 10 to propel an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan 12.

Figure 2:
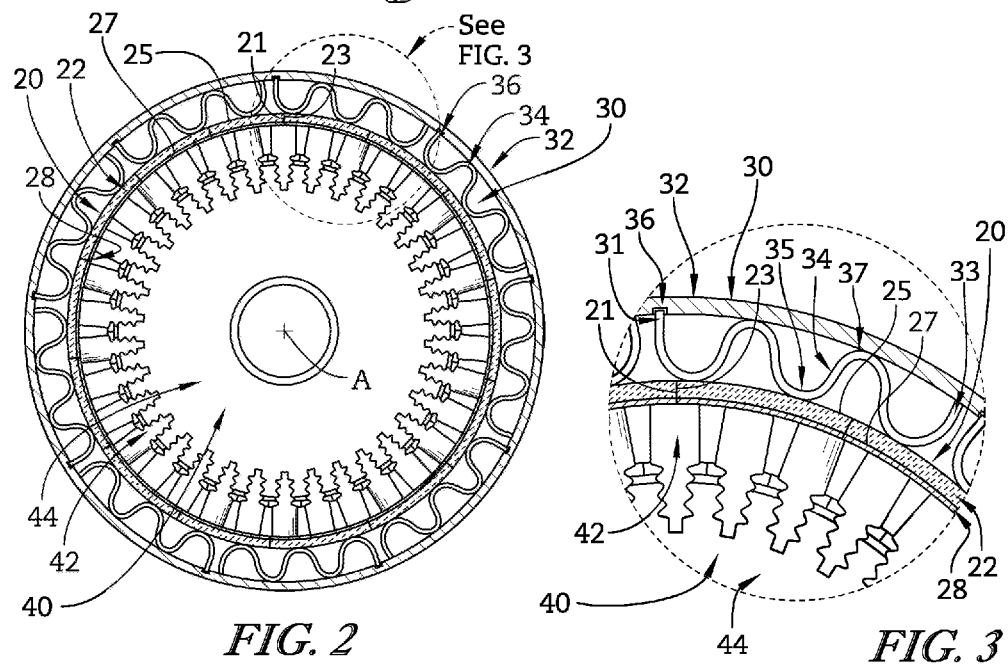
FIG. 2 is a sectional view of the gas turbine engine of FIG. 1 taken along line 2-2 showing a blade track including a plurality of blade track segments positioned to surround a turbine wheel assembly of the turbine and one embodiment of a track biaser in accordance with the present disclosure positioned to bias the blade track segments radially inward toward a central axis of the gas turbine engine.

The turbine 18 illustratively includes at least one turbine wheel assembly 40, a blade track 20 positioned to surround the turbine wheel assembly 40, and a track biaser 30 as shown in FIGS. 1 and 2. The turbine wheel assembly 40 includes a plurality of blades 42 coupled to a rotor disk 44 for rotation therewith. The hot, high pressure combustion products from the combustor 16 are directed toward the blades 42 of the turbine wheel assemblies 40. The blades 42 are in turn pushed by the combustion products to cause the turbine wheel assembly 40 to rotate; thereby, driving the rotating components of the compressor 14 and/or the fan 12.

The blade track 20 extends around the turbine wheel assembly 40 to block combustion products from passing over the blades 42 without pushing the blades 42 to rotate as suggested in FIG. 2. The blade track 20 includes a plurality of blade track segments 22 that cooperate to form a ring. The blade track segments 22 are each shaped to extend part-way around a central axis A and comprise ceramic-matrix composite materials. Each blade track segment 22 is illustratively made from silicon-carbide, silicon-carbide ceramic-matrix composite, but may be made from oxide, oxide ceramic-matrix composite or the like.

Figure 3:
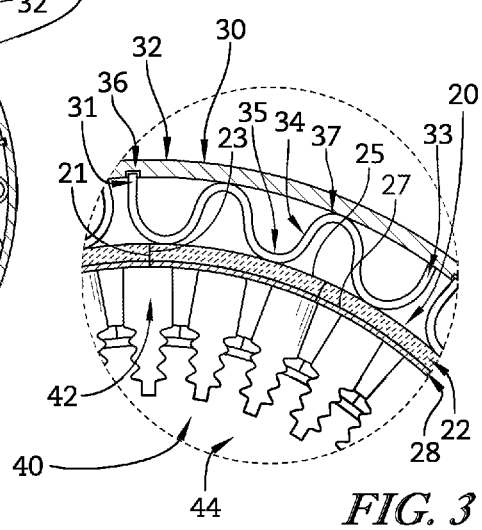
FIG. 3 is a detail view of the track biaser of FIG. 2 showing that circumferential end faces of adjacent blade track segments engage with one another to keystone against one another and suggesting that the track biaser includes a plurality of wave springs engaged between an inner case of the turbine and the blade track segments to provide a radially inward force that holds the blade track segments together.

Each of the blade track segments 22 includes opposing circumferential end faces 21, 23 and a radially outer surface 25 extending between the end faces 21, 23 as shown in FIGS. 2 and 3. An abradable layer 28 may be applied to a radially-inward face 27 of the blade track segments 22. The blade track segments 22 are positioned circumferentially around the central axis A to form a substantially continuous ring and the track biaser 30 is positioned to engage the outer surfaces 25 of the blade track segments 22 to maintain the shape of the blade track 20. In some embodiments, the end faces 21, 23 may include axial and/or radial alignment features to align the blade track segments 22 during assembly. For example, the non-planar alignment features described in U.S. Patent Application Ser. No. 62/154,400, which is incorporated by reference herein in its entirety, could be used.

In the illustrative embodiment, the track biaser 30 includes a plurality of wave springs 34 (sometimes called wave washers) positioned between the blade track 20 and an inner case 32 of the turbine 18 as shown in FIG. 2. Each wave spring 34 comprises a flexible metallic material, and includes a first end 31 and a second end 33 biased toward one another. The first end 31 is engaged with a recess 36 formed in the inner case 32 to maintain positioning of the wave spring 34. Each wave spring is formed to include a series of peaks 37 for engaging the inner case 32 and a series of valleys 35 for engaging the blade track segments 22.

In some embodiments, the wave springs 34 comprise ceramic-matrix composite materials and are thinned along their length with additional peaks 37 and valleys 35 to provide flexibility. In other embodiments, a single, continuous wave spring 34 extends around the blade track 20 and is not circumferentially constrained by the recess 36. The single, continuous wave spring 34 includes a gap to allow radial expansion and contraction. In some embodiments, the wave springs 34 are formed to include air holes positioned between the peaks 37 and valleys 35 to allow cooling air to flow around the blade track 20. In some embodiments, the inner case 32 includes impingement bosses which extend radially inward and are formed to include impingement holes for passing cooling air onto the blade track 20. In such an embodiment, the impingement bosses may pass through holes in the wave springs 34 or between the wave springs 34 to circumferentially locate the wave springs 34.

The end faces 21, 23 of the blade track segments 22 extend radially inward from the outer surface 25 and are positioned to lie in a plane defined in part by the central axis A as suggested in FIG. 2. The track biaser 30 is configured to provide a radially-inward force toward the central axis A against the blade track segments 22. The end faces 21, 23 of adjacent blade track segments 22 engage with one another to provide an opposing radially-outward force away from the central axis A and against the track biaser 30. As such, each blade track segment 22 acts as a keystone for circumferentially-adjacent blade track segments 22 to maintain the form of the blade track 20. The track biaser 30 maintains alignment of the blade track segments 22 in the ring.

Radially-inward loads placed on the blade track 20 are distributed through the blade track segments 22 as compressive hoop load as suggested in FIG. 2. Radially-outward loads placed on the blade track 20 are distributed through the track biaser 30. The ends 31, 33 of the wave springs 34 move toward one another as the blade track segments 22 are forced inward. The ends 31, 33 of the wave springs 34 move away from one another as the blade track segments 22 are forced outward. In some embodiments, engagement between the end faces 21, 23 forms a seal between adjacent blade track segments 22. In some embodiments, the blade track segments 22 are integrally joined through co-processing, welding, or brazing, for example, to form a seal between adjacent blade track segments 22.

Figure 4:
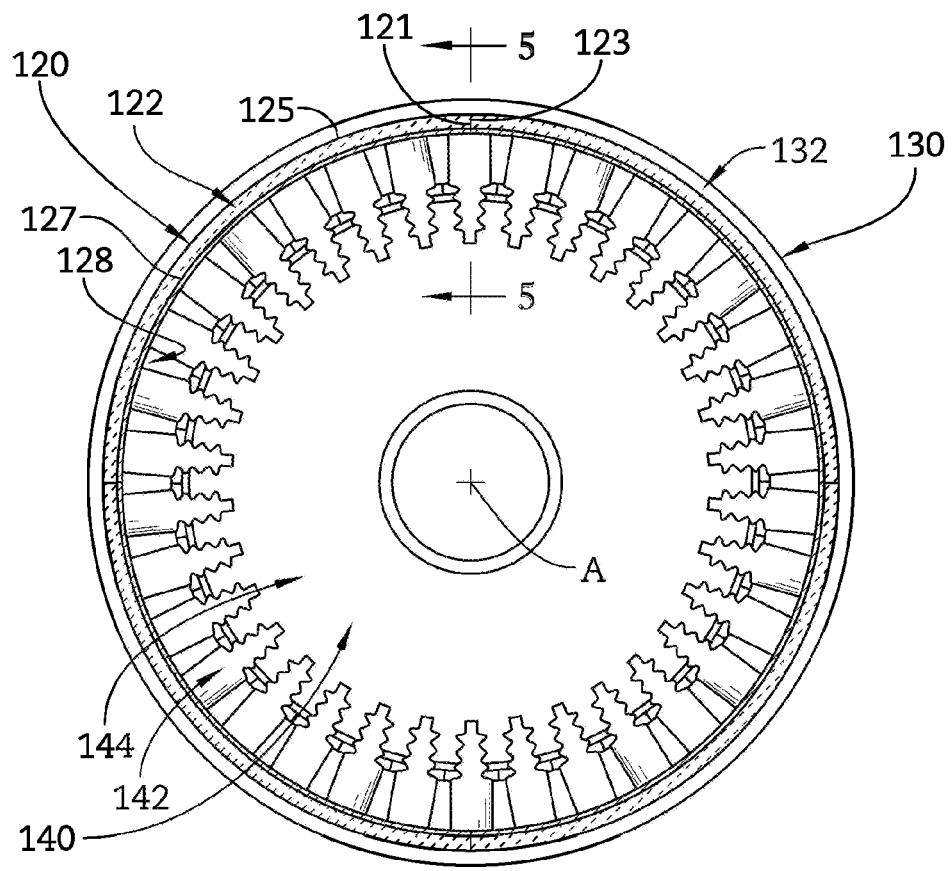
FIG. 4 is a view similar to FIG. 2 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine.

In another embodiment, the turbine 18 of the gas turbine engine 10 includes at least one turbine wheel assembly 140, a blade track 120 positioned to surround the turbine wheel assembly 140, and a track biaser 130 as shown in FIG. 4. The turbine wheel assembly 140 includes a plurality of blades 142 coupled to a rotor disk 144 for rotation therewith. The hot, high pressure combustion products from the combustor 16 are directed toward the blades 142 of the turbine wheel assemblies 140. The blades 142 are in turn pushed by the combustion products to cause the turbine wheel assembly 140 to rotate; thereby, driving the rotating components of the compressor 14 and/or the fan 12.

The blade track 120 extends around the turbine wheel assembly 140 to block combustion products from passing over the blades 142 without pushing the blades 142 to rotate as suggested in FIG. 4. The blade track 120 includes a plurality of blade track segments 122 that cooperate to form a ring. The blade track segments 122 are each shaped to extend part-way around the central axis A and comprise ceramic-matrix composite materials. Each blade track segment 122 is illustratively made from silicon-carbide, silicon-carbide ceramic-matrix composite, but may be made from oxide, oxide ceramic-matrix composite or the like.

Figure 5:
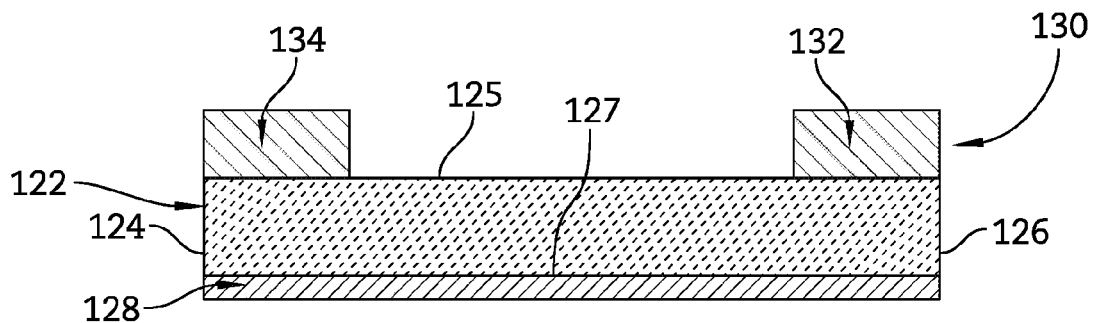
FIG. 5 is a sectional view of the track biaser of FIG. 4 taken along line 5-5 showing that the track biaser includes a pair of metallic rings engaged with a radially outer surface of the blade track segments to provide a radially inward force that holds the blade track segments together.

Each of the blade track segments 122 includes opposing circumferential end faces 121, 123 and a radially outer surface 125 extending between the end faces 121, 123 as shown in FIGS. 4 and 5. An abradable layer 128 may be applied to a radially-inward face 127 of the blade track segments 122. The blade track segments 122 are positioned circumferentially around the central axis A to form a substantially continuous ring and the track biaser 130 is positioned to engage the outer surfaces 125 of the blade track segments 122 to maintain the shape of the blade track 120.

In the illustrative embodiment, the track biaser 130 includes a pair of metallic rings 132, 134 positioned to surround the blade track 120 as shown in FIGS. 4 and 5. Each ring 132, 134 is sized to engage with the outer surfaces 125 of the blade track segments 122. In the illustrative embodiment, the ring 134 is aligned with axially-forward faces 124 of the blade track segments 122 and the ring 132 is aligned with axially-aft faces 126.

In some embodiments, the rings 132, 134 are press-fit onto the assembled blade track 120. In other embodiments, the rings 132, 134 are heated to expand the rings 132, 134, positioned around the blade track 120, and subsequently cooled to engage the blade track segments 122. In yet other embodiments, a step may be machined into the outer surfaces 125 of the blade track segments 122 along the axially-forward and axially-aft faces 124, 126 sized to receive the rings 132, 134. In such an embodiment, the rings 132, 134 would be radially inset from the outer surface 125. In yet other embodiments, the rings 132, 134 may be formed as metallic garter springs to maintain pressure against the outer surfaces 125 of the blade track segments 122 as the temperature varies.

In some embodiments, the rings 132, 134 comprise silicon-carbide, silicon-carbide ceramic-matrix composite, but may be made from oxide, oxide ceramic-matrix composite or the like. In such an embodiment, the rings 132, 134 can be assembled on to the blade track 120 using similar techniques described above. Alternatively, if the blade track segments 122 include alignment features, the rings 132, 134 may be loosely fit onto the blade track 120 and will provide a tighter interference fit at the operating temperature of the engine 10 due to a differential in temperature between the rings 132, 134 and blade track 120.

The end faces 121, 123 of the blade track segments 122 extend radially inward from the outer surface 125 and are positioned to lie in a plane defined in part by the central axis A as suggested in FIG. 4. The track biaser 130 is configured to provide a radially-inward force toward the central axis A against the blade track segments 122. The end faces 121, 123 of adjacent blade track segments 122 engage with one another to provide an opposing radially-outward force away from the central axis A and against the track biaser 130. As such, each blade track segment 122 acts as a keystone for circumferentially-adjacent blade track segments 122 to maintain the form of the blade track 120. The track biaser 130 maintains alignment of the blade track segments 122 in the ring.

Radially-inward loads placed on the blade track 120 are distributed through the blade track segments 122 as compressive hoop load as suggested in FIG. 4. Radially-outward loads placed on the blade track 120 are distributed through the rings 132, 134 as tensile hoop load. In some embodiments, engagement between the end faces 121, 123 forms a seal between adjacent blade track segments 122. In some embodiments, the blade track segments 122 are integrally joined through co-processing, welding, or brazing, for example, to form a seal between adjacent blade track segments 122.

Figure 6:
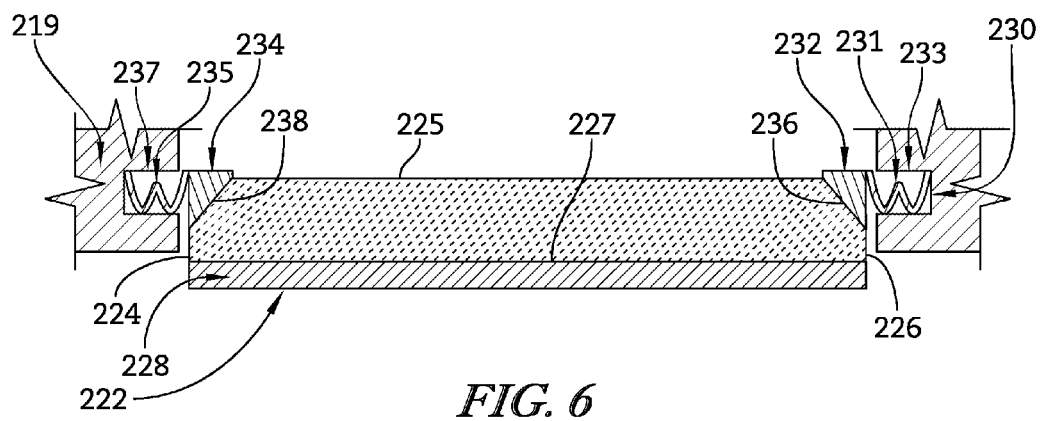
FIG. 6 is a view similar to FIG. 5 showing that another embodiment of a track biaser in accordance with the present disclosure includes a pair of metallic rings positioned to engage with angled, axial faces of the blade track segments to provide a radially inward force that holds the blade track segments together and suggesting that a pair of springs force the rings toward one another and against the blade track segments.

In another embodiment, a track biaser 230 includes a pair of metallic rings 232, 234 positioned to engage with bevel surfaces 236, 238 of a blade track segment 222 as shown in FIG. 6. In the illustrative embodiment, the ring 234 is aligned along an axially-forward face 224 of the blade track segment 222 and the ring 232 is aligned along an axially-aft face 226. The rings 232, 234 are biased toward one another by springs 231, 235, respectively. The springs 231, 235 are positioned in recesses 233, 237 formed in an inner case 219 of the gas turbine engine 10. In some embodiments, the springs 231, 235 act as sealing elements. In some embodiments, the blade track segment 222 includes an abradable layer 228 coupled to a radially-inward face 227. In some embodiments, the rings 232, 234 comprise silicon-carbide, silicon-carbide ceramic-matrix composite, but may be made from oxide, oxide ceramic-matrix composite or the like.

The rings 232, 234 engage with the bevel surfaces 236, 238 to provide a radially-inward force against the blade track segments 222 as suggested in FIG. 6. The bevel surfaces 236, 238 extend between the axial faces 224, 226 and a radially outer surface 225 of the blade track segment 222. Circumferential end faces of adjacent blade track segments 222 engage with one another to provide an opposing radially-outward force against the track biaser 230. As such, each blade track segment 222 acts as a keystone for circumferentially-adjacent blade track segments 222. The track biaser 230 maintains alignment of the blade track segments 222 in a ring. Each blade track segment 222 is illustratively made from silicon-carbide, silicon-carbide ceramic-matrix composite, but may be made from oxide, oxide ceramic-matrix composite or the like.

Figure 7:
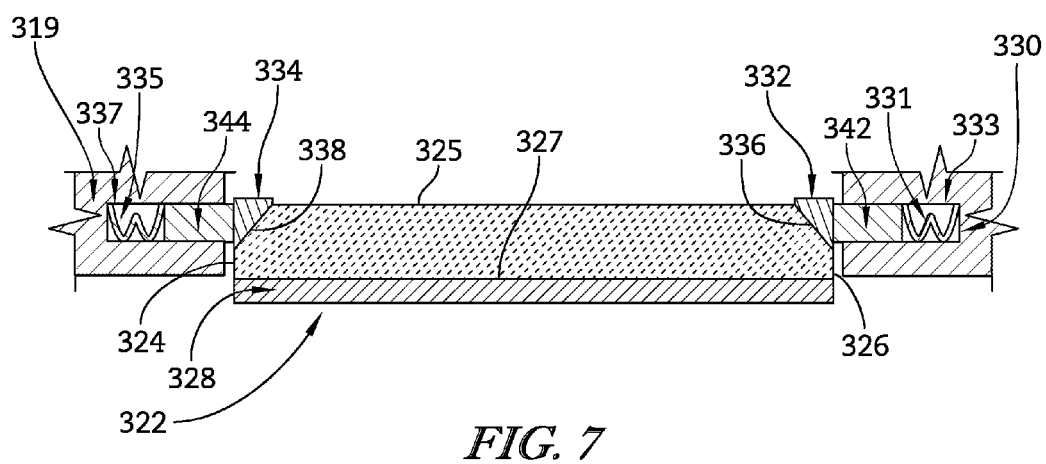
FIG. 7 is a view similar to FIG. 6 showing that another embodiment of a track biaser in accordance with the present disclosure includes a pair of metallic rings positioned to engage with angled, axial faces of the blade track segments to provide a radially inward force that holds the blade track segments together and suggesting that a pair of springs engage with spacers to force the rings toward one another and against the blade track segments.

In another embodiment, a track biaser 330 includes a pair of metallic rings 332, 334 positioned to engage with bevel surfaces 336, 338 of a blade track segment 322 as shown in FIG. 7. In the illustrative embodiment, the ring 334 is aligned along an axially-forward face 324 of the blade track segment 322 and the ring 332 is aligned along an axially-aft face 326. The rings 332, 334 are biased toward one another by springs 331, 335, respectively. The springs 331, 335 are positioned in recesses 333, 337 formed in an inner case 319 of the gas turbine engine 10. A pair of spacers 342, 344 are positioned between the springs 331, 335 and rings 332, 334. In some embodiments, the springs 331, 335 act as sealing elements. In some embodiments, the blade track segment 322 includes an abradable layer 328 coupled to a radially-inward face 327. In some embodiments, the rings 332, 334 comprise silicon-carbide, silicon-carbide ceramic-matrix composite, but may be made from oxide, oxide ceramic-matrix composite or the like.

The rings 332, 334 engage with the bevel surfaces 336, 338 to provide a radially-inward force against the blade track segments 322 as suggested in FIG. 7. The bevel surfaces 336, 338 extend between the axial faces 324, 326 and a radially outer surface 325 of the blade track segment 322. Circumferential end faces of adjacent blade track segments 322 engage with one another to provide an opposing radially-outward force against the track biaser 330. As such, each blade track segment 322 acts as a keystone for circumferentially-adjacent blade track segments 322. The track biaser 330 maintains alignment of the blade track segments 322 in a ring. Each blade track segment 322 is illustratively made from silicon-carbide, silicon-carbide ceramic-matrix composite, but may be made from oxide, oxide ceramic-matrix composite or the like.

Figure 8:
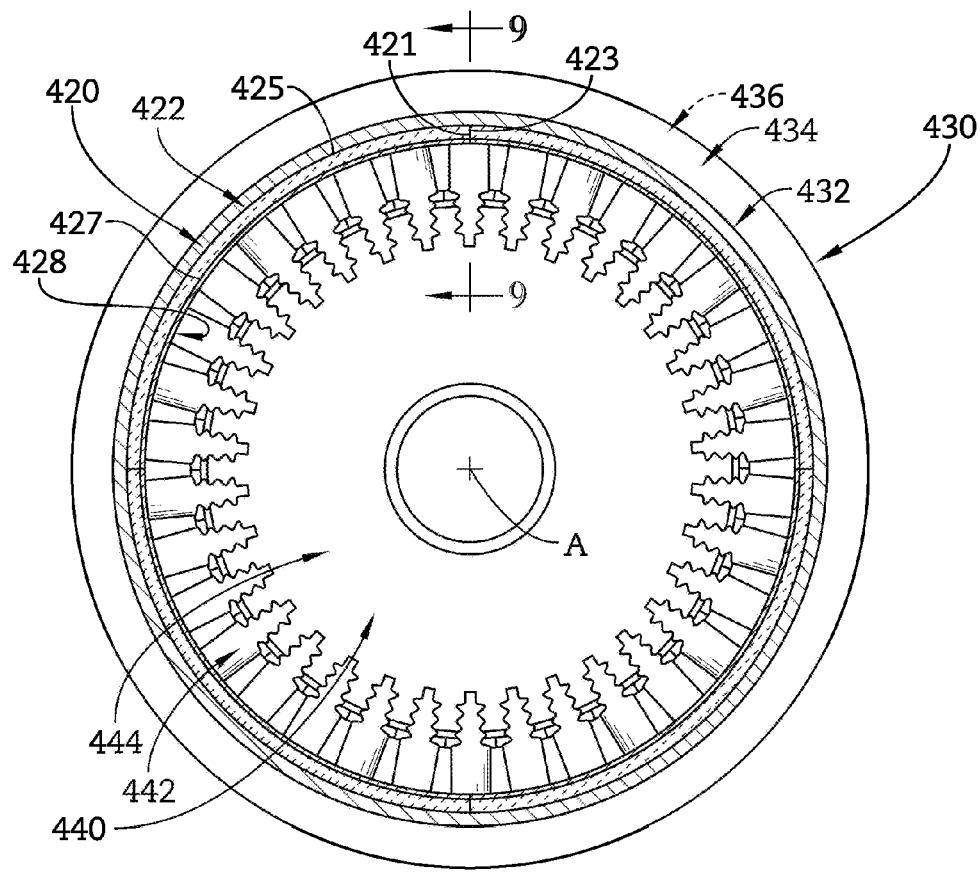
FIG. 8 is a view similar to FIG. 2 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine.

In another embodiment, the turbine 18 of the gas turbine engine 10 includes at least one turbine wheel assembly 440, a blade track 420 positioned to surround the turbine wheel assembly 440, and a track biaser 430 as shown in FIG. 8. The turbine wheel assembly 440 includes a plurality of blades 442 coupled to a rotor disk 444 for rotation therewith. The hot, high pressure combustion products from the combustor 16 are directed toward the blades 442 of the turbine wheel assemblies 440. The blades 442 are in turn pushed by the combustion products to cause the turbine wheel assembly 440 to rotate; thereby, driving the rotating components of the compressor 14 and/or the fan 12.

The blade track 420 extends around the turbine wheel assembly 440 to block combustion products from passing over the blades 442 without pushing the blades 442 to rotate as suggested in FIG. 8. The blade track 420 includes a plurality of blade track segments 422 that cooperate to form a ring. The blade track segments 422 are each shaped to extend part-way around the central axis A and comprise ceramic-matrix composite materials. Each blade track segment 422 is illustratively made from silicon-carbide, silicon-carbide ceramic-matrix composite, but may be made from oxide, oxide ceramic-matrix composite or the like.

Figure 9:
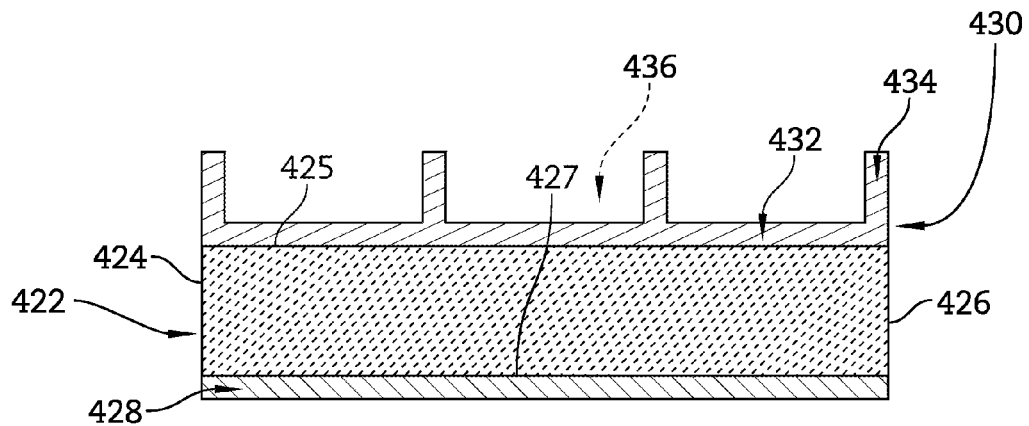
FIG. 9 is a sectional view of the track biaser of FIG. 8 taken along line 9-9 showing that the track biaser includes a metallic ring engaged with a radially outer surface of the blade track segments to provide a radially inward force that holds the blade track segments together and a plurality of fins extending radially outward from the ring to define cooling channels.

Each of the blade track segments 422 includes opposing circumferential end faces 421, 423 and a radially outer surface 425 extending between the end faces 421, 423 as shown in FIGS. 8 and 9. An abradable layer 428 may be applied to a radially-inward face 427 of the blade track segments 422. The blade track segments 422 are positioned circumferentially around the central axis A to form a substantially continuous ring and the track biaser 430 is positioned to engage the outer surfaces 425 of the blade track segments 422 to maintain the shape of the blade track 420.

In the illustrative embodiment, the track biaser 430 includes a metallic ring 432 positioned to surround the blade track 420 and a plurality of fins 434 extending radially outward from the ring 432 to define cooling channels 436 as shown in FIGS. 8 and 9. The ring 432 is sized to engage with the outer surfaces 425 of the blade track segments 422. The cooling channels 436 are positioned to receive cooling air for cooling the ring 432 and blade track 420. The fins 434 provide additional stiffness to the ring 432.

In the illustrative embodiment, the ring 432 extends between axially-forward faces 424 and axially-aft faces 426 of the blade track segments 422 as shown in FIG. 9. In some embodiments, the ring 432 is press-fit onto the assembled blade track 420. In other embodiments, the ring 432 is heated to expand the ring 432, positioned around the blade track 420, and subsequently cooled to engage the blade track segments 422.

The end faces 421, 423 of the blade track segments 422 extend radially inward from the outer surface 425 and are positioned to lie in a plane defined in part by the central axis A as suggested in FIG. 8. The track biaser 430 is configured to provide a radially-inward force toward the central axis A against the blade track segments 422. The end faces 421, 423 of adjacent blade track segments 422 engage with one another to provide an opposing radially-outward force away from the central axis A and against the track biaser 430. As such, each blade track segment 422 acts as a keystone for circumferentially-adjacent blade track segments 422 to maintain the form of the blade track 420. The track biaser 430 maintains alignment of the blade track segments 422 in the ring.

Radially-inward loads placed on the blade track 420 are distributed through the blade track segments 422 as compressive hoop load as suggested in FIG. 8. Radially-outward loads placed on the blade track 420 are distributed through the ring 432 as tensile hoop load. In some embodiments, engagement between the end faces 421, 423 forms a seal between adjacent blade track segments 422. In some embodiments, the blade track segments 422 are integrally joined through co-processing, welding, or brazing, for example, to form a seal between adjacent blade track segments 422. In some embodiments, the end faces 421, 423 come out of contact with one another as the temperature within the gas turbine engine 10 increases.

In the illustrative embodiment, the amount of cooling air supplied to the cooling channels 436 is controlled to control the amount of thermal expansion of the ring 432. As such, fluctuation of an inner diameter of the ring 432 is controlled. Similarly, a tip clearance between the blades 442 and the blade track segments 422 may also be controlled by controlling the amount of cooling air supplied. The track biaser 430 optionally includes cross-key locating features to align the blade track 420 relative to the turbine wheel assembly 440, for example via the outer case of the gas turbine engine 10. Axial seals used to separate the flow path around the blades 442 from an environment radially outward of the blade track 420 may engage with the track biaser 430.

Figure 10:
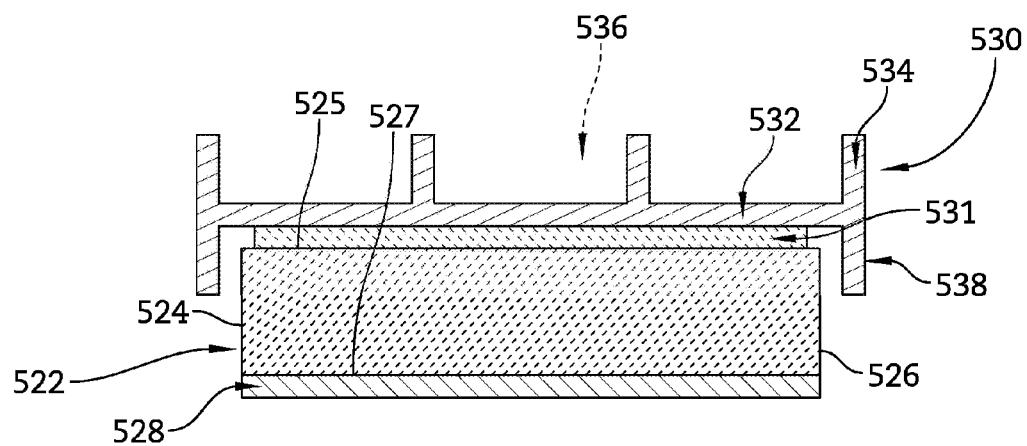
FIG. 10 is a view similar to FIG. 9 showing that another embodiment of a track biaser in accordance with the present disclosure includes a metallic ring engaged with an insulator layer coupled to a radially outer surface of the blade track segments to provide a radially inward force that holds the blade track segments together and a plurality of fins extending radially outward from the ring to define cooling channels.

In another embodiment, a track biaser 530 includes a metallic ring 532 and a plurality of fins 534 extending radially outward from the ring 532 to define cooling channels 536 as shown in FIG. 10. The ring 532 is sized to surround an assembled blade track formed from a plurality of circumferentially aligned blade track segments 522. The cooling channels 536 are positioned to receive cooling air for cooling the ring 532 and blade track segments 522.

In the illustrative embodiment, the ring 532 extends beyond axially-forward faces 524 and axially-aft faces 526 of the blade track segments 522 as shown in FIG. 10. A pair of flanges 538 extend radially inward from the ring 532 and are configured to restrict axial movement of the blade track segments 522 relative to the track biaser 530. The flanges 538 may include circumferentially spaced slots. In some embodiments, the blade track segments 522 include an abradable layer 528 coupled to a radially-inward face 527.

In the illustrative embodiment, the blade track segments 522 include a thermal barrier layer 531 and the track biaser 530 is configured to engage with the thermal barrier layer 531 as shown in FIG. 10. In some embodiments, the thermal barrier layer 531 is compliant to reduce resultant stresses and spread loads along the blade track segments 522. In some embodiments, the thermal barrier layer 531 comprises Mica or Mat Mount ceramic materials. The thermal barrier layer 531 limits heat transfer to the track biaser 530.

The track biaser 530 is configured to provide a radially-inward force against the blade track segments 522 as suggested in FIG. 10. Circumferential end faces of adjacent blade track segments 522 engage with one another to provide an opposing radially-outward force against the track biaser 530. As such, each blade track segment 522 acts as a keystone for circumferentially-adjacent blade track segments 522. The track biaser 530 maintains alignment of the blade track segments 522 in a ring. Each blade track segment 522 is illustratively made from silicon-carbide, silicon-carbide ceramic-matrix composite, but may be made from oxide, oxide ceramic-matrix composite or the like.

Figure 11:
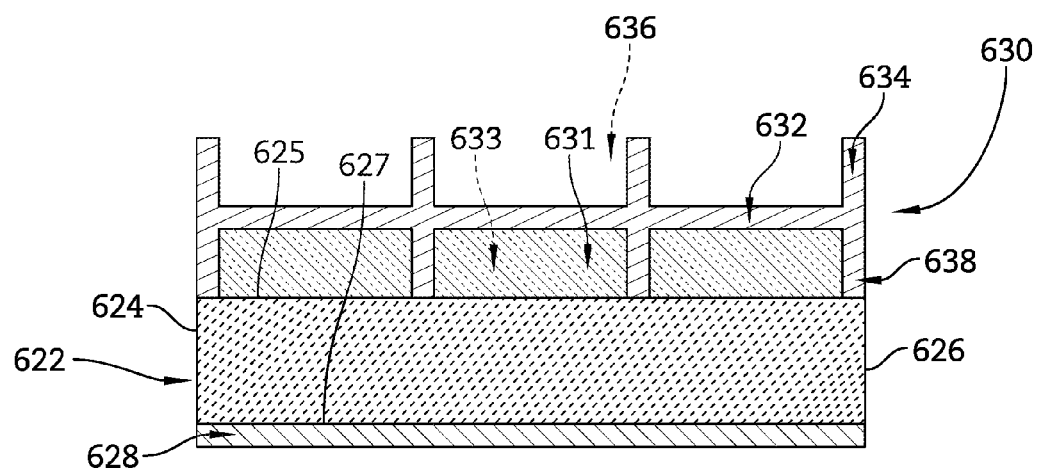
FIG. 11 is a view similar to FIG. 10 showing that another embodiment of a track biaser in accordance with the present disclosure includes a metallic ring, a plurality of insulator fins extending radially inward from the metallic ring to engage with the blade track segments to provide a radially inward force that holds the blade track segments together and define insulator channels to hold an insulative material therein, and a plurality of cooling fins extending radially outward from the ring to define cooling channels.

In another embodiment, a track biaser 630 includes a metallic ring 632, a plurality of outer fins 634 extending radially outward from the ring 632, and a plurality of inner fins 638 extending radially inward from the ring 632 as shown in FIG. 11. The outer fins 634 define cooling channels 636 and the inner fins 638 define insulation-receiving channels 633. The ring 632 is sized to surround an assembled blade track formed from a plurality of circumferentially aligned blade track segments 622.

The inner fins 638 are configured to engage with outer surfaces 625 of the blade track segments 622 as shown in FIG. 11. An insulative material 631 is positioned in the insulation-receiving channels 633 and trapped between the ring 632 and blade track segments 622. In some embodiments, the insulative material 631 comprises an aerogel or Mat Mount material which is optionally compressed. The inner fins 638 may include circumferentially spaced slots or other features to manage thermal gradients, peak temperatures, and stresses within the blade track segments 622 and ring 632. In some embodiments, insulation-receiving channels are formed into the outer surface 625 of the blade track segments 622. The cooling channels 636 of the track biaser 630 are positioned to receive cooling air for cooling the ring 632 and blade track segments 622. In some embodiments, the blade track segments 622 include an abradable layer 628 coupled to a radially-inward face 627.

In the illustrative embodiment, the ring 632 extends between axially-forward faces 624 and axially-aft faces 626 of the blade track segments 622 as shown in FIG. 11. The track biaser 630 is configured to provide a radially-inward force against the blade track segments 622. Circumferential end faces of adjacent blade track segments 622 engage with one another to provide an opposing radially-outward force against the track biaser 630. As such, each blade track segment 622 acts as a keystone for circumferentially-adjacent blade track segments 622. The track biaser 630 maintains alignment of the blade track segments 622 in a ring. Each blade track segment 622 is illustratively made from silicon-carbide, silicon-carbide ceramic-matrix composite, but may be made from oxide, oxide ceramic-matrix composite or the like.

In another embodiment, the turbine 18 of the gas turbine engine 10 includes at least one turbine wheel assembly 740, a blade track 720 positioned to surround the turbine wheel assembly 740, and a track biaser 730 as shown in FIG. 12. The turbine wheel assembly 740 includes a plurality of blades 742 coupled to a rotor disk 744 for rotation therewith. The hot, high pressure combustion products from the combustor 16 are directed toward the blades 742 of the turbine wheel assemblies 740. The blades 742 are in turn pushed by the combustion products to cause the turbine wheel assembly 740 to rotate; thereby, driving the rotating components of the compressor 14 and/or the fan 12.

The blade track 720 extends around the turbine wheel assembly 740 to block combustion products from passing over the blades 742 without pushing the blades 742 to rotate as suggested in FIG. 12. The blade track 720 includes a plurality of blade track segments 722 that cooperate to form a ring. The blade track segments 722 are each shaped to extend part-way around the central axis A and comprise ceramic-matrix composite materials. Each blade track segment 722 is illustratively made from silicon-carbide, silicon-carbide ceramic-matrix composite, but may be made from oxide, oxide ceramic-matrix composite or the like.

Each of the blade track segments 722 includes opposing circumferential end faces 721, 723 and a radially outer surface 725 extending between the end faces 721, 723 as shown in FIGS. 12 and 13. An abradable layer 728 may be applied to a radially-inward face 727 of the blade track segments 722. The blade track segments 722 are positioned circumferentially around the central axis A to form a substantially continuous ring and the track biaser 730 is positioned to engage the outer surfaces 725 of the blade track segments 722 to maintain the shape of the blade track 720.

In the illustrative embodiment, the track biaser 730 includes a metallic band 732 positioned to surround the blade track 720 and a pin 734 coupling ends 736, 738 of the band 732 together as shown in FIGS. 12 and 13. The band 732 is sized to engage with the outer surfaces 725 of the blade track segments 722. In the illustrative embodiment, the end 738 of the band 732 is positioned over a recess 731 formed in one of the blade track segments 722. The band 732 extends around the blade track 720 such that the end 736 is positioned over the end 738 as shown in FIG. 13. The pin 734 extends through the ends 736, 738 of the band 732 to couple the ends 736, 738 together. In some embodiments, the end 738 is positioned over the end 736. The pin 734 extends into the recess 731 to maintain circumferential alignment of the track biaser 730 with the blade track 720.

In some embodiments, the band 732 comprises silicon-carbide, silicon-carbide ceramic-matrix composite, but may be made from oxide, oxide ceramic-matrix composite or the like. In such an embodiment, the band 732 is formed such that an inner diameter of the band 732 substantially matches an outer diameter of the outer surfaces 725 of the blade track segments 722. Ceramic fibers used in the ceramic-matrix composite of the band 732 may extend along a length of the band 732 and wrap around the pin 734. The pin 734 may also comprise ceramic-matrix composite material. For example, ceramic fibers may be braided into a tube and solidified into a ceramic-matrix composite structure.

The end faces 721, 723 of the blade track segments 722 extend radially inward from the outer surface 725 and are positioned to lie in a plane defined in part by the central axis A as suggested in FIG. 12. The track biaser 730 is configured to provide a radially-inward force toward the central axis A against the blade track segments 722. The end faces 721, 723 of adjacent blade track segments 722 engage with one another to provide an opposing radially-outward force away from the central axis A and against the track biaser 730. As such, each blade track segment 722 acts as a keystone for circumferentially-adjacent blade track segments 722 to maintain the form of the blade track 720. The track biaser 730 maintains alignment of the blade track segments 722 in the ring.

Radially-inward loads placed on the blade track 720 are distributed through the blade track segments 722 as compressive hoop load as suggested in FIG. 12. Radially-outward loads placed on the blade track 720 are distributed through the band 732 as tensile hoop load. In some embodiments, engagement between the end faces 721, 723 forms a seal between adjacent blade track segments 722. In some embodiments, the blade track segments 722 are integrally joined through co-processing, welding, or brazing, for example, to form a seal between adjacent blade track segments 722.

In another embodiment, a blade track 820 formed from a plurality of blade track segments 822 is positioned to surround a turbine wheel assembly 840 as suggested in FIG. 14. The turbine wheel assembly 840 includes a plurality of blades 842 coupled to a rotor disk 844 for rotation therewith. In some embodiments, the blade track segments 822 include an abradable layer 828 coupled to a radially-inward face 827.

A track biaser 830 includes a metallic band 832 positioned to surround the blade track 820 and a pin 834 coupling ends 836, 838 of the band 832 together as shown in FIG. 14. The band 832 is sized to engage with outer surfaces 825 of the blade track segments 822. In the illustrative embodiment, the end 836 is formed to include a tab 835 and the end 838 is formed to include a slot 833 sized to receive the tab 835.

The end 838 of the band 832 is positioned over a recess 831 formed in one of the blade track segments 822 as shown in FIG. 14. The band 832 extends around the blade track 820 such that the tab 835 of the end 836 fits into the slot 833 of the end 838. The pin 834 extends through the ends 836, 838 of the band 832 to couple the ends 836, 838 together. The pin 834 extends into the recess 831 to maintain circumferential alignment of the track biaser 830 with the blade track 820.

In some embodiments, the band 832 comprises silicon-carbide, silicon-carbide ceramic-matrix composite, but may be made from oxide, oxide ceramic-matrix composite or the like. In such an embodiment, the band 832 is formed such that an inner diameter of the band 832 substantially matches an outer diameter of the outer surfaces 825 of the blade track segments 822. Ceramic fibers used in the ceramic-matrix composite of the band 832 may extend along a length of the band 832 and wrap around the pin 834. The pin 834 may also comprise ceramic-matrix composite material. For example, ceramic fibers may be braided into a tube and solidified into a ceramic-matrix composite structure.

The band 832 engages with the outer surfaces 825 to provide a radially-inward force against the blade track segments 822 as suggested in FIG. 14. Circumferential end faces 821, 823 of adjacent blade track segments 822 engage with one another to provide an opposing radially-outward force against the track biaser 830. As such, each blade track segment 822 acts as a keystone for circumferentially-adjacent blade track segments 822. The track biaser 830 maintains alignment of the blade track segments 822 in a ring. Each blade track segment 822 is illustratively made from silicon-carbide, silicon-carbide ceramic-matrix composite, but may be made from oxide, oxide ceramic-matrix composite or the like.

Figure 15:
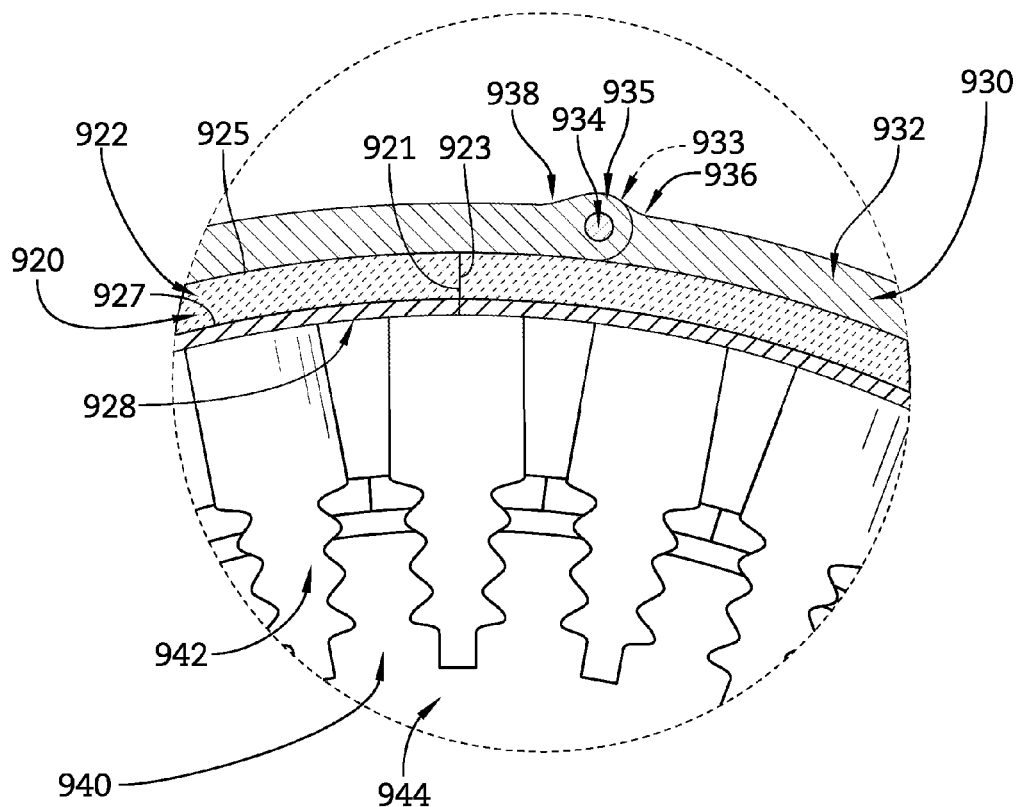
FIG. 15 is a view similar to FIG. 14 showing that another embodiment of a track biaser in accordance with the present disclosure includes a metallic band positioned to surround the blade track segments and an axially-extending pin coupled between fitted, opposing ends of the band and suggesting that the band engages with a radially outer surface of the blade track segments to provide a radially inward force that holds the blade track segments together.

In another embodiment, a blade track 920 formed from a plurality of blade track segments 922 is positioned to surround a turbine wheel assembly 940 as suggested in FIG. 15. The turbine wheel assembly 940 includes a plurality of blades 942 coupled to a rotor disk 944 for rotation therewith. In some embodiments, the blade track segments 922 include an abradable layer 928 coupled to a radially-inward face 927.

Figure 16:
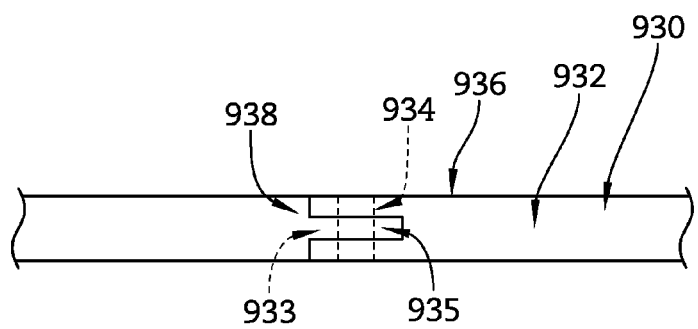
FIG. 16 is a top plan view of the band of FIG. 15 showing that one end of the band is formed to include a tab and the other end is formed to include a slot sized to receive the tab.

A track biaser 930 includes a metallic band 932 positioned to surround the blade track 920 and a pin 934 coupling ends 936, 938 of the band 932 together as shown in FIGS. 15 and 16. The band 932 is sized to engage with outer surfaces 925 of the blade track segments 922 as suggested in FIG. 15. In the illustrative embodiment, the end 938 is formed to include a tab 935 and the end 936 is formed to include a slot 933 sized to receive the tab 835 as shown in FIG. 16. The band 932 extends around the blade track 920 such that the tab 935 of the end 938 fits into the slot 933 of the end 936 as shown in FIGS. 15 and 16. The pin 934 extends through the ends 936, 938 of the band 932 to couple the ends 936, 938 together. Although one band 932 is shown, multiple bands 932 and pins 934 may be used.

In some embodiments, the band 932 comprises silicon-carbide, silicon-carbide ceramic-matrix composite, but may be made from oxide, oxide ceramic-matrix composite or the like. In such an embodiment, the band 932 is formed such that an inner diameter of the band 932 substantially matches an outer diameter of the outer surfaces 925 of the blade track segments 922. Ceramic fibers used in the ceramic-matrix composite of the band 932 may extend along a length of the band 932 and wrap around the pin 934. The pin 934 may also comprise ceramic-matrix composite material. For example, ceramic fibers may be braided into a tube and solidified into a ceramic-matrix composite structure. In some embodiments, the ends 936, 938 of the band 932 are spaced apart from one another and a spring-biased tensioning device is coupled between the ends 936, 938 to tighten the band 932 on the blade track 920.

The band 932 engages with the outer surfaces 925 to provide a radially-inward force against the blade track segments 922 as suggested in FIG. 15. Circumferential end faces 921, 923 of adjacent blade track segments 922 engage with one another to provide an opposing radially-outward force against the track biaser 930. As such, each blade track segment 922 acts as a keystone for circumferentially-adjacent blade track segments 922. The track biaser 930 maintains alignment of the blade track segments 922 in a ring. Each blade track segment 922 is illustratively made from silicon-carbide, silicon-carbide ceramic-matrix composite, but may be made from oxide, oxide ceramic-matrix composite or the like.

Figure 17:
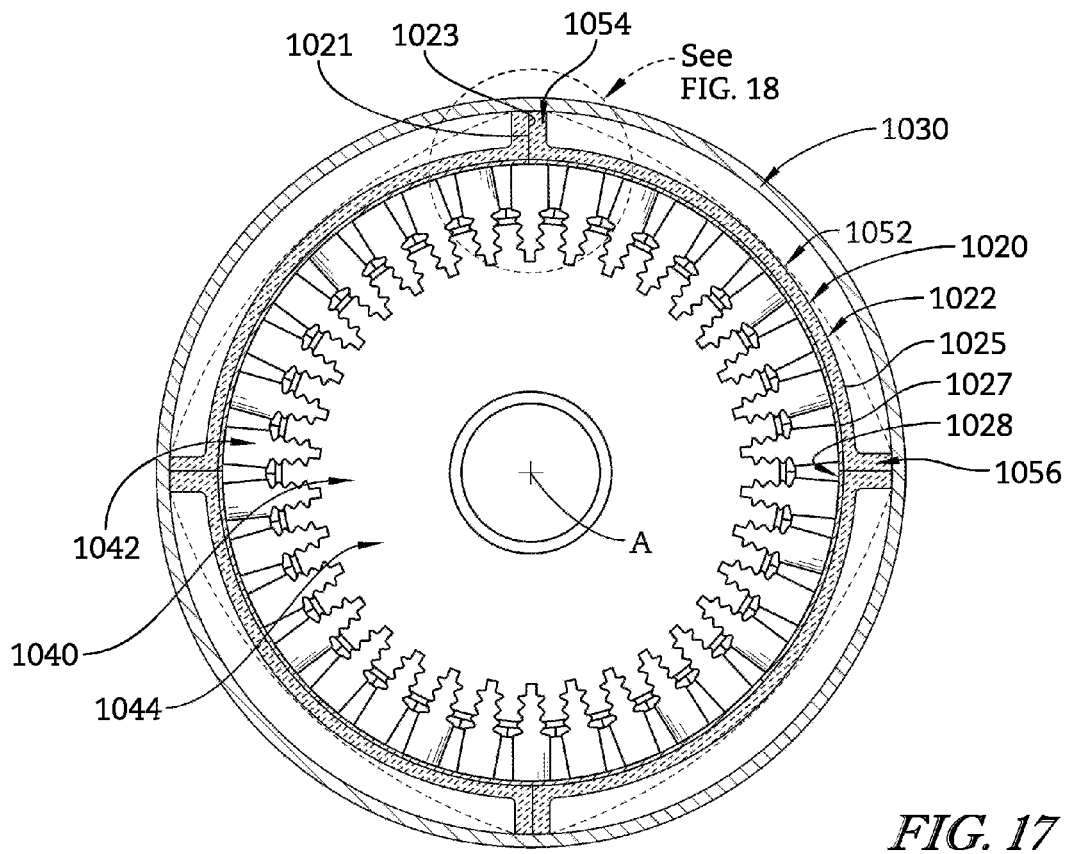
FIG. 17 is a view similar to FIG. 2 showing another embodiment of a track biaser in accordance with the present disclosure positioned to surround a plurality of blade track segments having a runner and a pair of radially-outward extending flanges coupled to circumferential ends of the runner.

In another embodiment, the turbine 18 of the gas turbine engine 10 includes at least one turbine wheel assembly 1040, a blade track 1020 positioned to surround the turbine wheel assembly 1040, and a track biaser 1030 as shown in FIG. 17. The turbine wheel assembly 1040 includes a plurality of blades 1042 coupled to a rotor disk 1044 for rotation therewith. The hot, high pressure combustion products from the combustor 16 are directed toward the blades 1042 of the turbine wheel assemblies 1040. The blades 1042 are in turn pushed by the combustion products to cause the turbine wheel assembly 1040 to rotate; thereby, driving the rotating components of the compressor 14 and/or the fan 12.

The blade track 1020 extends around the turbine wheel assembly 1040 to block combustion products from passing over the blades 1042 without pushing the blades 1042 to rotate as suggested in FIG. 17. The blade track 1020 includes a plurality of blade track segments 1022 that cooperate to form a ring. The blade track segments 1022 are each shaped to extend part-way around the central axis A and comprise ceramic-matrix composite materials. Each blade track segment 1022 is illustratively made from silicon-carbide, silicon-carbide ceramic-matrix composite, but may be made from oxide, oxide ceramic-matrix composite or the like.

Figure 18:
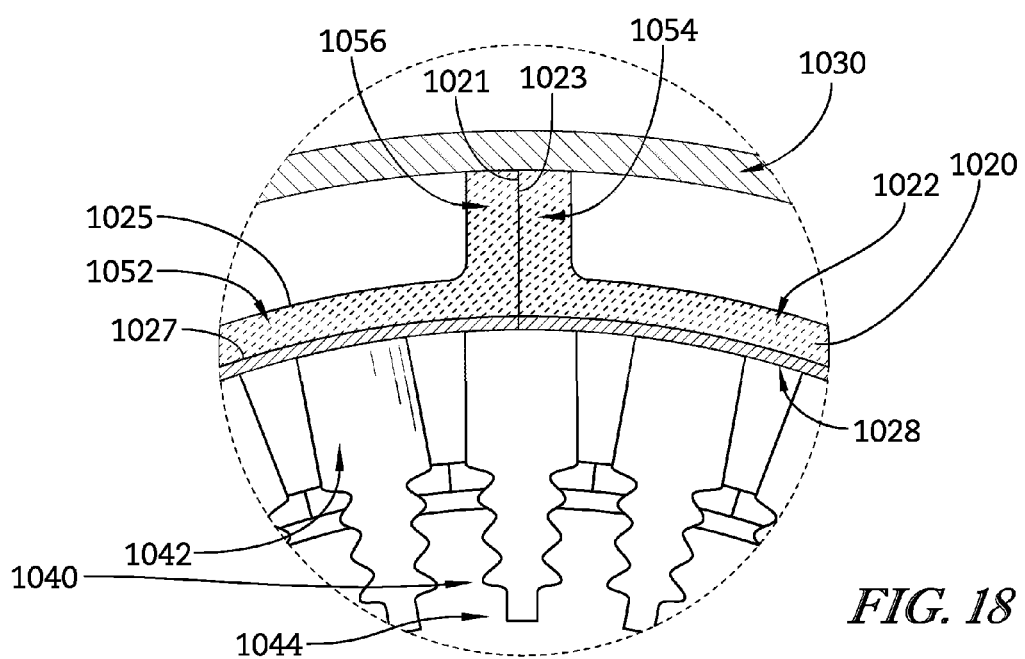
FIG. 18 is a detail view of the track-biaser system of FIG. 17 showing that the track biaser is positioned to engage the flanges of the blade track segments to bias the blade track segments radially inward and suggesting that circumferential end faces defined by the flanges engage with one another to keystone against one another.

Each of the blade track segments 1022 includes a runner 1052 along which the blades 1042 of the turbine wheel assembly 1040 move and a pair of flanges 1054, 1056 that extend from the runner 1052 as shown in FIG. 18. The flanges 1054, 1056 illustratively extend radially outward from an outer surface 1025 of the runner 1052. The flanges 1054, 1056 define opposing circumferential end faces 1021, 1023 of the blade track segment 1022. An abradable layer 1028 may be applied to a radially-inward face 1027 of the blade track segments 1022.

The blade track segments 1022 are positioned circumferentially around the central axis A to form a substantially continuous ring as shown in FIG. 17. The track biaser 1030 is positioned to engage the flanges 1054, 1056 of the blade track segments 1022 to maintain the shape of the blade track 1020. Contact between the track biaser 1030 and blade track 1020 is thereby minimized to minimize heat transfer and possible contamination transfer to the track biaser 1030. In the illustrative embodiment, the track biaser 1030 comprises a metallic ring positioned to surround the blade track 1020 as suggested in FIGS. 17 and 18. In some embodiments, the track biaser 1030 includes a plurality of segments joined together. In some embodiments, multiple track biasers 1030 may be used.

The track biaser 1030 is configured to provide a radially-inward force toward the central axis A against the blade track segments 1022 as suggested in FIG. 17. As the temperature within the engine 10 changes, the track biaser 1030 may expand more than the blade track 1020 due to differentials in coefficients of thermal expansion between the track biaser 1030 and blade track 1020. In the illustrative embodiment, the track biaser 1030 is heated to expand the track biaser 1030, positioned around the blade track 1020, and subsequently cooled to engage the flanges 1054, 1056 of the blade track segments 1022. Upon cooling, the track biaser 1030 may be configured to flex as suggested by the phantom line in FIG. 17. The track biaser 1030 may optionally contact the outer surfaces 1025 of the runners 1052 depending on a height of the flanges 1054, 1056 and flexibility of the track biaser 1030. In such an embodiment, the radially-inward force provided by the track biaser 1030 may increase by a step upon contact with the runner 1052. During heating, the track biaser 1030 flexes outward, from the phantom line position to the position shown in FIG. 17, in order to maintain contact with the flanges 1054, 1056.

The relative expansion and contact between the track biaser 1030 and blade track 1020 can be controlled to control the magnitude of the radially-inward force on the flanges 1054, 1056 at different operating temperatures. For example, at lower temperatures (such as at cold build or idle) where material allowables are higher, when the track biaser 1030 has not grown significantly compared to the blade track 1020, the blade track 1020 could contact the runner 1052 providing a greater load to hold the blade track segments 1022 together. At higher temperature operating points (such as at takeoff or cruise) the track biaser 1030 could outgrow the blade track 1020, lessening the load and resulting in no contact between the flange ends. This reduces the interference loads and stresses at high temperature operating points where material allowables are lower.

The end faces 1021, 1023 of the blade track segments 1022 extend radially inward from the outer surface 1025 and are positioned to lie in a plane defined in part by the central axis A as suggested in FIG. 17. The end faces 1021, 1023 of adjacent blade track segments 1022 engage with one another to provide an opposing radially-outward force away from the central axis A and against the track biaser 1030. As such, each blade track segment 1022 acts as a keystone for circumferentially-adjacent blade track segments 1022 to maintain the form of the blade track 1020. In some embodiments, ceramic fibers within the ceramic-matrix composite structure of the flanges 1054, 1056 are aligned parallel with the end faces 1021, 1023. The track biaser 1030 maintains alignment of the blade track segments 1022 in the ring.

Radially-inward loads placed on the blade track 1020 are distributed through the blade track segments 1022 as compressive hoop load as suggested in FIG. 17. Radially-outward loads placed on the blade track 1020 are distributed through the track biaser 1030 as tensile hoop load. In some embodiments, engagement between the end faces 1021, 1023 forms a seal between adjacent blade track segments 1022. In some embodiments, the blade track segments 1022 are integrally joined through co-processing, welding, or brazing, for example, to form a seal between adjacent blade track segments 1022.

In another embodiment, a blade track 1120 formed from a plurality of blade track segments 1122 is positioned to surround a turbine wheel assembly 1140 as suggested in FIG. 19. The turbine wheel assembly 1140 includes a plurality of blades 1142 coupled to a rotor disk 1144 for rotation therewith. In the illustrative embodiment, a track biaser 1130 comprises a metallic ring positioned to surround the blade track 1120.

Each of the blade track segments 1122 includes a runner 1152 along which the blades 1142 of the turbine wheel assembly 1140 move and a pair of flanges 1154, 1156 that extend from the runner 1152 as shown in FIG. 19. The flanges 1154, 1156 illustratively extend radially outward from an outer surface 1125 of the runner 1152 and are spaced apart from opposing circumferential end faces 1121, 1123 of the blade track segments 1122. In some embodiments, the blade track segments 1122 include an abradable layer 1128 coupled to a radially-inward face 1127.

The track biaser 1130 is positioned to engage the flanges 1154, 1156 of the blade track segments 1122 to maintain the shape of the blade track 1120 as suggested in FIG. 19. The track biaser 1130 engages with the flanges 1154, 1156 to provide a radially-inward force against the blade track segments 1122. The circumferential end faces 1121, 1123 of adjacent blade track segments 1122 engage with one another to provide an opposing radially-outward force against the track biaser 1130. As such, each blade track segment 1122 acts as a keystone for circumferentially-adjacent blade track segments 1122. Each blade track segment 1122 is illustratively made from silicon-carbide, silicon-carbide ceramic-matrix composite, but may be made from oxide, oxide ceramic-matrix composite or the like.

In another embodiment, a blade track 1220 formed from a plurality of blade track segments 1222 is positioned to surround a turbine wheel assembly 1240 as suggested in FIG. 20. The turbine wheel assembly 1240 includes a plurality of blades 1242 coupled to a rotor disk 1244 for rotation therewith. In the illustrative embodiment, a track biaser 1230 comprises a metallic ring positioned to surround the blade track 1220.

Each of the blade track segments 1222 includes a runner 1252 along which the blades 1242 of the turbine wheel assembly 1240 move and a pair of flanges 1254, 1256 that extend from the runner 1252 as shown in FIG. 20. In some embodiments, the blade track segments 1222 include an abradable layer 1228 coupled to a radially-inward face 1227. The flanges 1254, 1256 illustratively extend radially outward from an outer surface 1225 of the runner 1252. Each of the flanges 1254, 1256 includes an inner end 1255 coupled to the runner 1252 and an outer end 1253 spaced radially outward from the inner end 1255.

The track biaser 1230 is positioned to engage the flanges 1254, 1256 of the blade track segments 1222 to maintain the shape of the blade track 1220 as suggested in FIG. 20. The runner 1252 and outer ends 1253 of the flanges 1254, 1256 cooperate to define circumferential end faces 1221, 1223 of the blade track segments 1222. The track biaser 1230 engages with the flanges 1254, 1256 to provide a radially-inward force against the blade track segments 1222. The circumferential end faces 1221, 1223 of adjacent blade track segments 1222 engage with one another to provide an opposing radially-outward force against the track biaser 1230. As such, each blade track segment 1222 acts as a keystone for circumferentially-adjacent blade track segments 1222.

At least a portion of each flange 1254, 1256 is spaced apart from the end faces 1221, 1223 as suggested in FIG. 20. As such, an air gap 1251 is formed between adjacent blade track segments 1222 when the blade track 1220 is assembled. In some embodiments, the air gap 1251 is positioned to receive cooling air for cooling the blade track 1220. Each blade track segment 1222 is illustratively made from silicon-carbide, silicon-carbide ceramic-matrix composite, but may be made from oxide, oxide ceramic-matrix composite or the like.

In another embodiment, a blade track 1320 formed from a plurality of blade track segments 1322 is positioned to surround a turbine wheel assembly 1340 as suggested in FIG. 21. The turbine wheel assembly 1340 includes a plurality of blades 1342 coupled to a rotor disk 1344 for rotation therewith. In the illustrative embodiment, a track biaser 1330 comprises a metallic ring positioned to surround the blade track 1320.

Each of the blade track segments 1322 includes a runner 1352 along which the blades 1342 of the turbine wheel assembly 1340 move and a pair of flanges 1354, 1356 that extend from the runner 1352 as shown in FIG. 21. In some embodiments, the blade track segments 1322 include an abradable layer 1328 coupled to a radially-inward face 1327. The flanges 1354, 1356 illustratively extend radially outward from an outer surface 1325 of the runner 1352. Each of the flanges 1354, 1356 includes an inner end 1355 coupled to the runner 1352 and an outer end 1353 spaced radially outward from the inner end 1355.

The track biaser 1330 is positioned to engage the flanges 1354, 1356 of the blade track segments 1322 to maintain the shape of the blade track 1320 as suggested in FIG. 21. The runner 1352 and outer ends 1353 of the flanges 1354, 1356 cooperate to define circumferential end faces 1321, 1323 of the blade track segments 1322. The track biaser 1330 engages with the flanges 1354, 1356 to provide a radially-inward force against the blade track segments 1322. The circumferential end faces 1321, 1323 of adjacent blade track segments 1322 engage with one another to provide an opposing radially-outward force against the track biaser 1330. As such, each blade track segment 1322 acts as a keystone for circumferentially-adjacent blade track segments 1322.

At least a portion of each flange 1354, 1356 is spaced apart from the end faces 1321, 1323 as suggested in FIG. 21. As such, an insulator receiver 1351 is formed between adjacent blade track segments 1322 when the blade track 1320 is assembled. An insulative material 1357 is positioned in the insulator receiver 1351. In some embodiments, the insulative material 1357 comprises an aerogel or Mat Mount material which is optionally compressed. Each blade track segment 1322 is illustratively made from silicon-carbide, silicon-carbide ceramic-matrix composite, but may be made from oxide, oxide ceramic-matrix composite or the like.

In another embodiment, a blade track 1420 formed from a plurality of blade track segments 1422 is positioned to surround a turbine wheel assembly 1440 as suggested in FIG. 22. The turbine wheel assembly 1440 includes a plurality of blades 1442 coupled to a rotor disk 1444 for rotation therewith. In the illustrative embodiment, a track biaser 1430 is positioned to surround the blade track 1420.

Each of the blade track segments 1422 includes a runner 1452 along which the blades 1442 of the turbine wheel assembly 1440 move and a pair of flanges 1454, 1456 that extend from the runner 1452 as shown in FIG. 22. The flanges 1454, 1456 illustratively extend radially outward from an outer surface 1425 of the runner 1452. The flanges 1454, 1456 define opposing circumferential end faces 1421, 1423 of the blade track segment 1422. An abradable layer 1428 may be applied to a radially-inward face 1427 of the blade track segments 1422.

In the illustrative embodiment, the track biaser 1430 includes a plurality of ring segments 1433 coupled between a plurality of air-flow heads 1431 distributed circumferentially around the blade track 1420 as suggested in FIG. 22. The ring segments 1433 extend along and are radially spaced apart from the runners 1452 of the blade track segments 1422 to define an air gap 1436. The ring segments 1433 couple to the air-flow heads 1431 to form a continuous enclosure around the blade track 1420.

In the illustrative embodiment, each air-flow head 1431 is formed to include a recess 1438 sized to receive the flanges 1454, 1456 of an adjacent pair of blade track segments 1422 as suggested in FIG. 22. The flanges 1454, 1456 and recesses 1438 cooperate to cross-key the blade track 1420 relative to the track biaser 1430. The air-flow heads 1431 are also formed to include one or more cooling-air plenums 1432 and one or more holes 1434 in fluid communication with the cooling-air plenum 1432 and the air gap 1436. Cooling air flows from the cooling-air plenum 1432 through the holes 1434 and into the air gap 1436 to pressurize the space between the track biaser 1430 and blade track segments 1422. In some embodiments, the flanges 1454, 1456 and air-flow heads 1431 are aligned with hot spots of the combustor 16 so that the air-flow heads 1431 can provide additional localized cooling to the blade track 1420.

The pressure in the air gap 1436 provides a radially-inward force against the blade track segments 1422 as suggested in FIG. 22. The circumferential end faces 1421, 1423 of adjacent blade track segments 1422 engage with one another to provide an opposing radially-outward force against the pressure in the air gap 1436. As such, each blade track segment 1422 acts as a keystone for circumferentially-adjacent blade track segments 1422. Each blade track segment 1422 is illustratively made from silicon-carbide, silicon-carbide ceramic-matrix composite, but may be made from oxide, oxide ceramic-matrix composite or the like.

The present disclosure contemplates taking advantage of the high temperature capability of ceramic-matrix composites (CMC) to improve specific fuel consumption (SFC) with a full hoop CMC blade track. By eliminating the gaps between the blade track segments, the cooling and leakage air flow rates needed to cool the blade track are significantly reduced, thereby improving SFC.

Large full hoop blade tracks can be difficult to manufacture. First of all, it may require large processing equipment and in some cases this can require a different process as well. This may end up being costly because of the investment in larger equipment as well as development of a different process required by the new, larger processing equipment. Secondly, creating large diameter, thin walled parts may be difficult to do without distortion and out of roundness.

The present disclosure contemplates overcoming these difficulties by building a full hoop CMC blade track out of multiple segments, keystoned together, and held in place via a supporting hoop on their outer surface. Contact between the segments as they are forced together into a solid ring would provide a seal between the gas path and the cavity outboard of the ring of CMC segments. Integrally joining the ring of segments via co-processing, brazing, welding, etc. may further ensure sealing between segments. Alternatively, the blade track segments may be assembled together in a partially processed state, such as after chemical vapor infiltration (CVI), and receive final processing together, such as through a slurry or melt infiltration. As such, the blade track segments would be integrally joined, not allowing relative movement during operation of the engine.

The full hoop may be cross-keyed in place to mount it concentric to the centerline of the engine. Non-planar features between segments that would self locate the segments radially and/or axially to one another may be incorporated into the shown design without departing from the intended scope of the disclosure. Such features may be an assembly aid as well as a means to ensure parts do not slip relative to each other during operation of the engine.

The blade track segments may receive additional processing to meet design tolerances. For example, the inner surface (or flowpath face) may be machined for roundness and surface roughness to maximize SFC. The outer diameter of the blade track may be machined for roundness and surface roughness to provide a round seating surface for mating components and minimize stack up contributing to interference fit stresses.

The blade track and track biaser assemblies described herein are illustratively shown in a turbine of a gas turbine engine. However, these assemblies may be used in other portions of the engine without departing from the scope of the present disclosure. For example, a segmented blade track may be positioned in a compressor of the engine with a track biaser positioned to maintain the shape of the blade track. In another example, a segmented combustor liner, similar to the blade tracks described herein, may be positioned in a combustor of the engine with a liner biaser, similar to the track biasers described herein, positioned to maintain the shape of the combustor liner.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein the track biaser includes at least one unitary ring sized to surround the blade track and engage the outer surfaces of the blade track segments, and wherein the at least one unitary ring includes a first unitary ring substantially aligned with an axially-forward face of the blade track segments and a second unitary ring substantially aligned with an axially-aft face of the blade track segments.

2. The blade track of claim 1, wherein each of the blade track segments further includes a first bevel surface extending between the axially-forward face and the outer surface and a second bevel surface extending between the axially-aft face and the outer surface, wherein the first and second bevel surfaces are angled radially inward relative to the outer surface, and wherein the first and second rings are configured to engage the first and second bevel surfaces to provide the radially-inward force, and further comprising springs positioned to bias the first and second rings toward one another.

3. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein the track biaser includes at least one unitary ring sized to surround the blade track and engage the outer surfaces of the blade track segments, and wherein the track biaser further includes a plurality of outer fins extending radially outward from and circumferentially along the at least one unitary ring, and wherein the fins are spaced apart from one another to define radially-outwardly opening cooling channels.

4. The blade track of claim 3, further comprising one of a thermal barrier layer and an insulative material positioned between the at least one unitary ring and the blade track.

5. The blade track of claim 3, wherein the track biaser further includes a plurality of inner fins extending radially inward from and circumferentially along the at least one unitary ring, and wherein the inner fins are spaced apart from one another to define insulation-receiving channels that contain an insulative material.

6. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein the track biaser includes at least one band having first and second ends and the at least one band is sized to surround the blade track to engage the outer surfaces of the blade track segments and the track biaser includes a pin extending through the first and second ends of the band to couple the first end to the second end.

7. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein each of the blade track segments further includes a runner and a pair of flanges that extend radially outward from the outer surface of the blade track segment, wherein the track biaser is sized and positioned to contact the flanges, and wherein the flanges are spaced apart from the end faces on the outer surface of the blade track segments.

8. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein each of the blade track segments further includes a runner and a pair of flanges that extend radially outward from the outer surface of the blade track segment, wherein the track biaser is sized and positioned to contact the flanges, wherein the flanges at least partially define the end faces of the blade track segments, and wherein the flanges each include a first end coupled to the runner and a second end spaced from the first end, wherein the second ends of adjacent blade track segments engage with one another, and wherein the flanges of adjacent blade track segments cooperate to form a gap between the flanges located radially between the first end and the second end.

9. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein each of the blade track segments further includes a runner and a pair of flanges that extend radially outward from the outer surface of the blade track segment, and wherein the track biaser includes a plurality of air-flow heads and a plurality of ring segments coupled between the air-flow heads such that the track biaser surrounds the blade track.

10. The blade track of claim 9, wherein the ring segments are radially spaced apart from the runners of the blade track segments to define an air gap.

11. The blade track of claim 10, wherein the air-flow heads are formed to include at least one cooling-air plenum and at least one hole in fluid communication with the air gap and cooling-air plenum.

12. The blade track of claim 11, wherein the air-flow heads are configured to pass cooling air from the cooling-air plenum into the air gap to pressurize a space between the track biaser and the blade track to provide a radially-inward force on the blade track segments.

13. A blade-track system for a gas turbine engine, the blade-track system comprising a plurality of blade track segments positioned circumferentially around a central axis to form a ring providing a blade track, each blade track segment comprising ceramic-matrix composite materials and shaped to extend part-way around the central axis, each blade track segment including opposing circumferential end faces and a radially outer surface, and a track biaser positioned to surround the blade track, wherein the end faces of the blade track segments are engaged with one another and the track biaser is configured to bias the blade track segments toward the central axis such that each blade track segment acts as a keystone to maintain the form of the ring, wherein the end faces of the blade track segments are configured to engage and form a resultant radially-outward force away from the central axis against the track biaser and wherein the track biaser is positioned to engage the radially outer surface of the blade track segments to provide a radially-inward force against the blade track segments, wherein the track biaser includes a ring sized to surround the blade track and a plurality of wave springs positioned between the ring and the blade track, and wherein each wave spring includes a first end and a second end spaced apart from the first end and wherein the ring is formed to include a plurality of recesses and wherein the first ends of the wave springs are positioned in the recesses to circumferentially locate the wave springs.

* * * * *